US011611245B2

(12) United States Patent
Muratov et al.

(10) Patent No.: US 11,611,245 B2
(45) Date of Patent: Mar. 21, 2023

(54) WIRELESSLY CHARGING MOBILE PHONE VIA NOTEBOOK TOUCHPAD

(71) Applicant: MEDIATEK Singapore Pte. Ltd., Singapore (SG)

(72) Inventors: Vladimir Alexander Muratov, San Jose, CA (US); Fu-Chi Lin, Chupei (TW)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/372,402

(22) Filed: Jul. 9, 2021

(65) Prior Publication Data

US 2022/0052563 A1    Feb. 17, 2022

Related U.S. Application Data

(60) Provisional application No. 63/064,994, filed on Aug. 13, 2020.

(51) Int. Cl.
*G06F 3/0354* (2013.01)
*H02J 50/80* (2016.01)
(Continued)

(52) U.S. Cl.
CPC .......... *H02J 50/80* (2016.02); *G06F 3/03547* (2013.01); *G06F 3/04812* (2013.01); *H02J 50/10* (2016.02)

(58) Field of Classification Search
CPC .............. G06F 3/03547; G06F 3/0481; G06F 3/04812; H02J 50/80
See application file for complete search history.

(56) References Cited

U.S. PATENT DOCUMENTS 10,175,736 B2    1/2019   Kim
10,193,390 B2    1/2019   Riehl
(Continued)

FOREIGN PATENT DOCUMENTS

CN    106786905 A    5/2017
CN    107852016 A    3/2018
(Continued)

OTHER PUBLICATIONS

No Author Listed, Remote Mouse. Microsoft. Jul. 2019; 3 pages. https://www.microsoft.com/en-us/p/remote-mouse/9nt1plxw3k9j?activetab=pivot:overviewtab [Last accessed Sep. 7, 2021].
(Continued)

*Primary Examiner* — Robert J Michaud
(74) *Attorney, Agent, or Firm* — Wolf, Greenfield & Sacks, P.C.

(57) ABSTRACT

A mobile device can be used to control a computing device different from the mobile device. The mobile device includes a processor configured to receive user input through a graphical user interface (GUI) of the mobile device. The processor can be configured to generate the GUI after detecting a magnetic field generated by a wireless power transmitter. The GUI includes a simulated button and/or an interface configured to receive tactile input indicative of spatial information. The processor is configured to provide information indicative of user input to the computing device to control the computing device.

21 Claims, 13 Drawing Sheets

(51) Int. Cl.
H02J 50/10 (2016.01)
G06F 3/04812 (2022.01)

(56) References Cited

U.S. PATENT DOCUMENTS

| | | |
|---|---|---|
| 10,381,858 B2 | 8/2019 | Patten |
| 10,886,771 B2 | 1/2021 | Kasar et al. |
| 2016/0259373 A1* | 9/2016 | Hsu ..................... G06F 1/1632 |
| 2017/0170678 A1* | 6/2017 | Uhm ..................... H02J 7/0044 |
| 2019/0044366 A1* | 2/2019 | Moon ..................... G06F 1/16 |

FOREIGN PATENT DOCUMENTS

| | | |
|---|---|---|
| CN | 108429363 A | 8/2018 |
| CN | 109565187 A | 4/2019 |
| GB | 2547450 A | 8/2017 |
| JP | 6475919 B2 | 2/2019 |
| TW | I530047 B | 4/2016 |

OTHER PUBLICATIONS

EP 21190837.1, Nov. 18, 2021, Extended European Search Report.
Extended European Search Report dated Nov. 18, 2021 in connection with European Application No. 21190837.1.

* cited by examiner

WIRELESSLY CHARGING MOBILE PHONE VIA NOTEBOOK TOUCHPAD

CROSS-REFERENCE TO RELATED APPLICATIONS

This application claims priority to U.S. Provisional Patent Application Ser. No. 63/064,994, titled "WIRELESSLY CHARGING MOBILE PHONE VIA NOTEBOOK TOUCHPAD," filed Aug. 13, 2020, which is hereby incorporated by reference in its entirety.

BACKGROUND

Wireless Power Transfer Systems (WPTS) are gaining increasing popularity as a convenient way for delivering power without wires or connectors. The systems under development in the industry include a wireless power transmitter and a wireless power receiver. Such systems can be used to power or charge mobile devices such as smartphones or tablet computers, among other applications.

BRIEF SUMMARY

Some embodiments provide for a mobile device, comprising: a processor configured to: detect a magnetic field generated by a wireless power transmitter; and after detecting the magnetic field, generate a first graphical user interface (GUI) of the mobile device, wherein the first GUI comprises a simulated button and/or an interface configured to receive tactile input indicative of spatial information.

The wireless power transmitter may be within a computing device different from the mobile device.

The wireless power transmitter may be beneath a trackpad of the computing device.

The mobile device may be positioned above the trackpad of the computing device such that the mobile device is configured to be charged by the wireless power transmitter.

The processor may be further configured to: receive user input through the first GUI of the mobile device; and provide information indicative of the user input to the computing device to control the computing device.

Providing the information indicative of the user input to the computing device may comprise communicating the information indicative of the user input through a wireless data exchange.

Providing the information indicative of the user input to the computing device may comprise communicating the information indicative of the user input between a wireless power receiver of the mobile device and the wireless power transmitter.

Providing the information indicative of the user input may comprise in-band and/or out-of-band communication.

The first GUI may comprise a simulated trackpad.

Providing the information indicative of the user input to the computing device may cause the computing device to perform a function specified by a user.

Providing the information indicative of the user input to the computing device may cause the computing device to change a position of a cursor in a second GUI of the computing device.

Providing the information indicative of the user input to the computing device may cause the computing device to generate text.

Generating the first GUI may comprise generating the first GUI in response to detecting the magnetic field.

The processor may be further configured to, in response to detecting the magnetic field, prompt a user for additional information prior to generating the first GUI.

Prompting the user for the additional information may comprise prompting the user to confirm whether to generate the first GUI; generating the first GUI may comprise generating the first GUI in response to receiving user input.

The processor may be further configured to, after generating the first GUI, establish a wireless data exchange a wireless connection with a computing device different from the mobile device to reflect, in a second GUI of the computing device, tactile inputs received by the first GUI.

The spatial information may comprise information indicative of a position of a cursor in a second GUI of the computing device.

Providing the information indicative of the user input to the computing device may comprise wirelessly communicating the information indicative of the user input to the computing device.

Some embodiments provide for a method, comprising: detecting a magnetic field generated by a wireless power transmitter; and after detecting the magnetic field, generating a first graphical user interface (GUI) of the mobile device, wherein the first GUI comprises a simulated button and/or an interface configured to receive tactile input indicative of spatial information.

Some embodiments provide for at least one non-transitory computer-readable storage medium storing processor executable instructions that, when executed by at least one processor, cause the at least one processor to perform: detecting a magnetic field generated by a wireless power transmitter; and after detecting the magnetic field, generating a first graphical user interface (GUI) of the mobile device, wherein the first GUI comprises a simulated button and/or an interface configured to receive tactile input indicative of spatial information.

Some embodiments provide for a system, comprising: a processor configured to: detect a magnetic field generated by a wireless power transmitter; and after detecting the magnetic field, generate a first graphical user interface (GUI) of the mobile device, wherein the first GUI comprises a simulated button and/or an interface configured to receive tactile input indicative of spatial information; and a computing device comprising a second processor configured to display a second GUI based on the tactile input.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
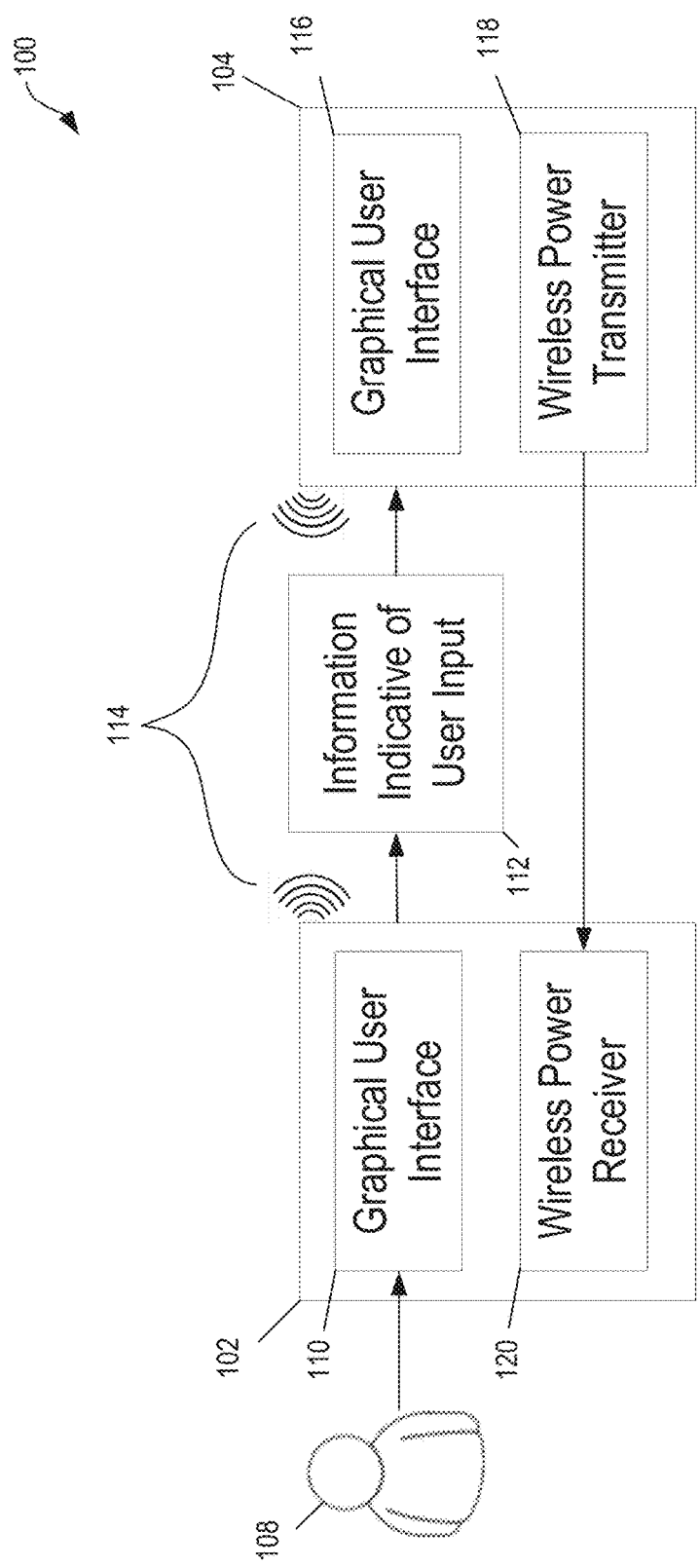
FIG. 1 shows a block diagram of a system for controlling a computing device using a mobile device and/or wirelessly powering the mobile device.

Wireless power transfer systems typically include a wireless power receiver and a wireless power transmitter. The wireless power receiver may be included in a mobile device (e.g., a smartphone or laptop computer) and can have power transferred thereto wirelessly by a wireless power transmitter. The wireless power transmitter may be within a pad or stand on which the mobile device can be placed, for example, during wireless charging.

It has been proposed to embed a wireless power transmitter within a computing device such as a laptop computer to charge other devices, such as a mobile device (e.g., smartphone). However, the present inventors have appreciated challenges with mobile device placement on a laptop computer. Exterior components of a laptop computer that may be suitable for supporting the placement of a mobile device include the keyboard, the palm rests, and the touchpad. Although a wireless transmitter may be embedded beneath any such component, placing a mobile device on such locations of a laptop computer may impede usage of the laptop computer. For example, embedding the wireless transmitter beneath the palm rest, which is the flat surface on either side of the touchpad, may prevent a user from comfortably operating the keyboard while the mobile device is positioned on the palm rest. Similarly, embedding the wireless power transmitter beneath the keyboard would inhibit keyboard operation. Finally, embedding the wireless power transmitter beneath the touchpad would impede touchpad operation while the mobile device is charging, since the mobile device would cover portions of the touchpad.

The inventors have developed techniques and apparatus for addressing the above-identified challenges. In some embodiments, a wireless power transmitter is embedded beneath the touchpad and/or associated button(s) of a laptop computer, and while the mobile device is positioned over the touchpad, the touch screen of the mobile device may act as the touchpad and/or associated button(s) of the laptop computer. The mobile device may control the laptop computer through wireless communication between the mobile device and the laptop computer according to inputs on the touch screen of the mobile device. Accordingly, the functionality of the touchpad and/or associated buttons of the laptop computer may be provided by the mobile device, allowing the mobile device to charge while continuing to provide the functionality of the touchpad and/or associated buttons of the laptop computer.

An application stored on the mobile device may be used to operate the computing device. For example, the application may be configured to receive user input through a graphical user interface (GUI). The GUI may include one or more simulated buttons, a simulated keyboard, a simulated trackpad, or any other suitable configurations for receiving user input. The user input may be communicated to the computing device, causing the computing device to perform one or more functions. For example, receiving input through a simulated trackpad on the mobile device may cause a cursor to move with respect to the screen on the computing device. As another example, receiving user input through a simulated keyboard may cause the computing device to generate text. The inventors have appreciated that such an application would enable simultaneous operation of both the computing device and the mobile device, while the mobile device is being wirelessly powered via a wireless power transmitter embedded in the computing device.

FIG. 1 shows a block diagram of a system 100 for controlling a computing device 104 using a mobile device 102 and/or wirelessly powering the mobile device 102 using the computing device 104. Mobile device 102 includes graphical user interface (GUI) 110 configured to receive input from user 108. The mobile device 102 establishes a wireless data exchange 114 with the computing device 104 through which it communicates information indicative of user input 112 to control the computing device 104. In some embodiments, this may include controlling a GUI 116 running on computing device 104. The computing device 104 may further include wireless power transmitter 116 which may transfer power to wireless power receiver 120.

Mobile device 102 may include any suitable device, such as a smartphone or tablet. In some embodiments, the mobile device 102 may include one or more user interfaces, such as a touch-sensitive display, one or more buttons, a microphone, or any other suitable interface. In some embodiments, the mobile device includes a processor, memory, or any other suitable elements, such as those described with respect to computing system 1100 of FIG. 11.

GUI 110 may include one or more GUIs of an application executing on the mobile device 102. For example, a user may interact with a first GUI of an application to establish wireless data exchange 114 and a second GUI of the application to cause the computing device 104 to perform one or more functions. In some embodiments, the GUI 110 may include one or more selectable elements through which a user 108 may interact. For example, the GUI 110 may include one or more simulated buttons, each of which may cause the computing device 104 to perform one or more specified functions. As another example, the GUI 110 may include one or more menus that allow the user 108 to select wireless communication details and/or customize the GUI for controlling the computing device (e.g., specify the functions corresponding to the simulated buttons).

In some embodiments, establishing wireless data exchange 114 may include establishing a wireless connection by means of any suitable wireless communication protocol known in the field of computing and mobile devices. Examples of such communication protocols are provided herein.

In some embodiments computing device 104 may be configured to execute one or more functions specified by the information indicative of user input 112. For example, the computing device 104 may activate an application according to the information indicative of the user input 112. As another example, the computing device 104 may operate a cursor on GUI 116 according to the information indicative of the user input 112. In some embodiments, computing device 104 may include one or more computing devices each of which may be of any suitable type. Examples of such computing devices are provided herein.

GUI 116 may include one or more GUIs of one or more corresponding applications executing on the computing device. In some embodiments, the GUI 116 may include one or more selectable elements and a cursor for navigating and interacting with selectable elements. User 108 may provide input to GUI 110 of mobile device 102 to cause computing device 104 to control the cursor with respect to GUI 116, perform functions within GUI 116, and/or switch between one or more GUIs.

In some embodiments, the computing device 104 may further include a wireless power transmitter 118 in communication with a wireless power receiver 120 included in the mobile device 102. The wireless power transmitter 118 and wireless power receiver 120 may communicate with one another through in-band or out-of-band communication (e.g., communicate the information indicative of user input 112). The techniques described herein are not limited as to the communication technique used to transfer this information. In some embodiments, the wireless power transmitter 118 may be embedded in any suitable location of the computing device 104. For example, the wireless power transmitter 118 may be embedded beneath the touchpad, keyboard, palm rest, or any other suitable location. An example of a wireless power transfer system is described herein including with respect to FIG. 10.

Figure 2:
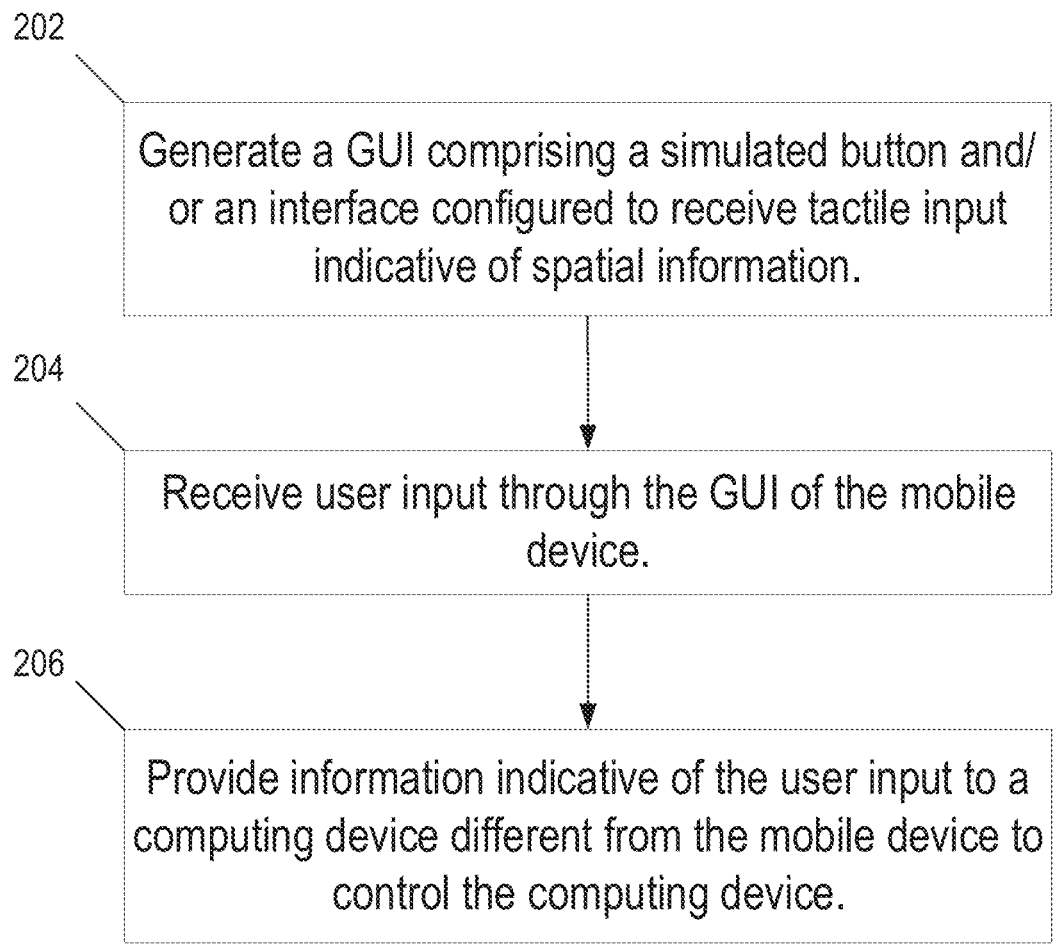
FIG. 2 shows a flowchart of a method for controlling a computing device using a mobile device.

FIG. 2 shows a flowchart of a method for controlling a computing device using a mobile device. The method of FIG. 2 may be performed by a processor of a mobile device, for example.

At step 202, the mobile device generates a GUI. The GUI may include one or more simulated buttons and/or one or more interfaces configured to receive tactile input indicative of spatial information (e.g., a position of an input on a touch screen). In some embodiments, a simulated button may correspond to a specific function on the computing device. For example, the GUI may include a simulated button that mimics the function of the right mouse button of a conventional computer mouse (e.g., activates a menu on a GUI of the computing device.) In some embodiments, the function of a simulated button may be customizable within the application executing on the mobile device. In some embodiments, an interface configured to receive tactile input indicative of spatial information may include any interface used to move the position of a cursor with respect to a GUI of computing device. For example, the GUI may include a simulated trackpad, analog stick, trackball, or any other suitable interface configured for receiving motion and/or position data.

At step 204, the mobile device receives user input through the GUI of the mobile device. In some embodiments, receiving user input may include receiving input when a user interacts with a user interface of the mobile device. In some embodiments, this may include receiving input through a touch-sensitive display of the mobile device. For example, the user may select one of the simulated buttons by tapping or holding a position on the touch-sensitive display. As another example, the user may perform gestures, such as swiping the touch-sensitive display, to provide input through the interface configured to receive tactile input indicative of spatial information. In some embodiments, the user may provide input using a stylus or any suitable instrument for providing tactile input through the GUI. In some embodiments, the user may provide verbal commands through a microphone of the mobile device to indicate a selection on the GUI. In some embodiments, the user may select one or more buttons to navigate and select elements of the GUI.

At step 206, the mobile device provides information indicative of user input to a computing device to control the computing device. In some embodiments, as described herein, this may include wirelessly communicating the information indicative of user input to the computing device. For example, providing the information indicative of user input may cause the computing device to move a cursor, interact with a GUI, execute one or more applications, generate text, and/or any other suitable functions. Further examples of computing device functions are described herein.

Figure 3A:
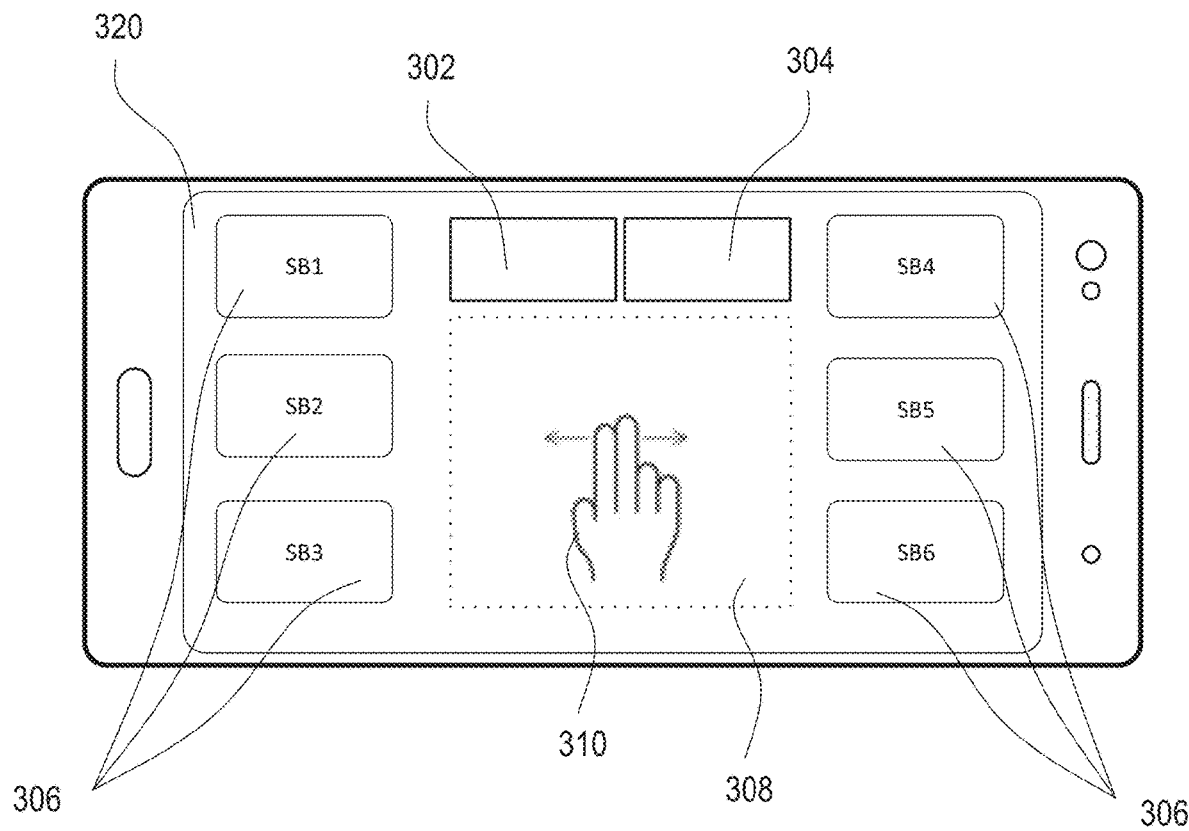
FIG. 3A shows an example GUI configured to receive user input through simulated buttons and an interface configured to receive spatial input.

FIG. 3A shows an example GUI of an application executing on a mobile device that is configured to receive user input through simulated buttons 302, 304, 306 and an interface configured to receive tactile input indicative of spatial information 308.

The simulated buttons 302, 304, 306 may each be configured to cause a computing device to perform a specified function. In some embodiments, a user may configure a simulated button by interacting with a separate GUI of the application executing on the mobile device. For example, upon activating the application, a user may be presented with a GUI for providing details for customizing the function corresponding to each simulated button.

Figure 3B:
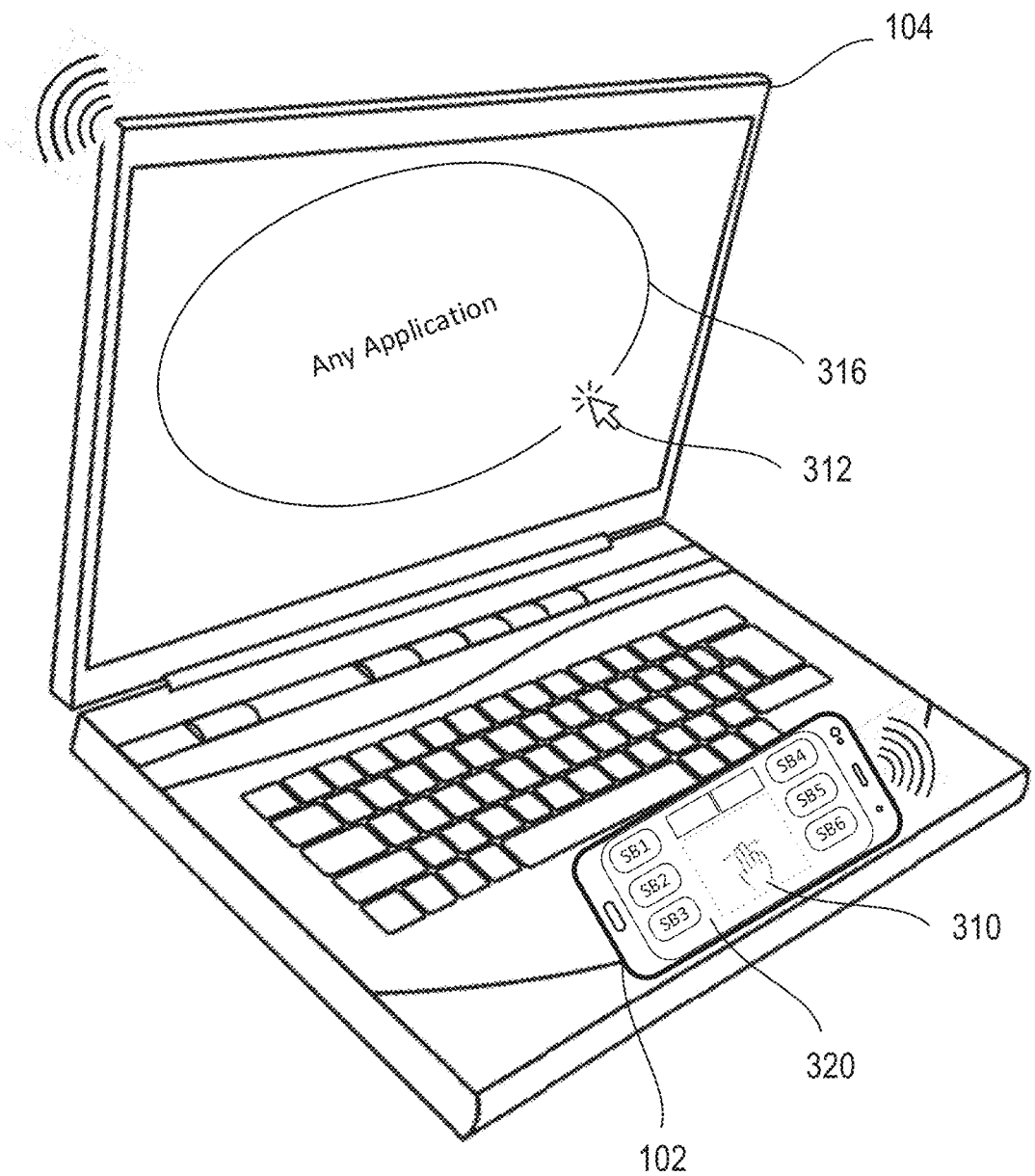
FIG. 3B shows an example of controlling a computing device using a mobile device including the example GUI shown in FIG. 3A.

For the purpose of this example, the simulated buttons 302 and 304 correspond to functions associated with conventional left and right mouse buttons, respectively. A user may select (e.g., tap or hold) simulated button 302 to select an object, open hyperlinks, close windows, select text, perform drag and drop operations, or perform other functions on the computing device that correspond to a conventional left mouse button. For example, as shown in FIG. 3B, selecting the simulated button 302 may cause the computing device 104 to make a selection at the position of cursor 312. A user may select simulated button 304 to perform functions that correspond to a conventional right mouse button. For example, selecting the simulated button 304 may activate a drop-down menu that includes, for example, commonly used functions and/or functions specific to the application executing on the computing device. For example, this may cause a drop-down menu to appear at the position of cursor 312, shown in FIG. 3B.

The simulated buttons 306 may be configured to cause the computing device to perform any suitable function, examples of which are described below. It should be appreciated that these are examples, and a simulated button may be configured with a variety of functions.

As a first example, one or more simulated buttons may be configured to activate one or more applications on the computing device. In some embodiments, a simulated button may correspond to a specific application. If the mobile device receives user input through the simulated button, it may cause the specific application to run on the computing device. For example, as shown in FIG. 3B, receiving user input through the simulated buttons 306 may cause the computing device 104 to run application 316. Additionally or alternatively, one or more simulated buttons may be configured to scroll between applications that are already running on the computing device. For example, receiving user input through a simulated button may cause the GUI of a different application to replace the GUI of application 316 on the screen of the computing device.

As a second example, the one or more simulated buttons may be configured to replicate functions that may typically be included in a toolbar of an application (e.g., functions for editing, formatting, filing, reviewing, etc.). One or more simulated buttons may correspond to functions included in a toolbar. Accordingly, receiving user input through such a simulated button may cause the computing device to perform the corresponding function. For example, a simulated button may be configured to insert a symbol in a document. Receiving user input through the simulated button may cause a menu to open on the GUI of the mobile device and/or a GUI of the computing device that lists symbols that a user can select from. As another example, a simulated button may be configured to change the layout of a document. Receiving user input through the simulated button may cause a menu to open on the GUI of the mobile device and/or a GUI of the computing device that lists document layout options.

Figure 3C:
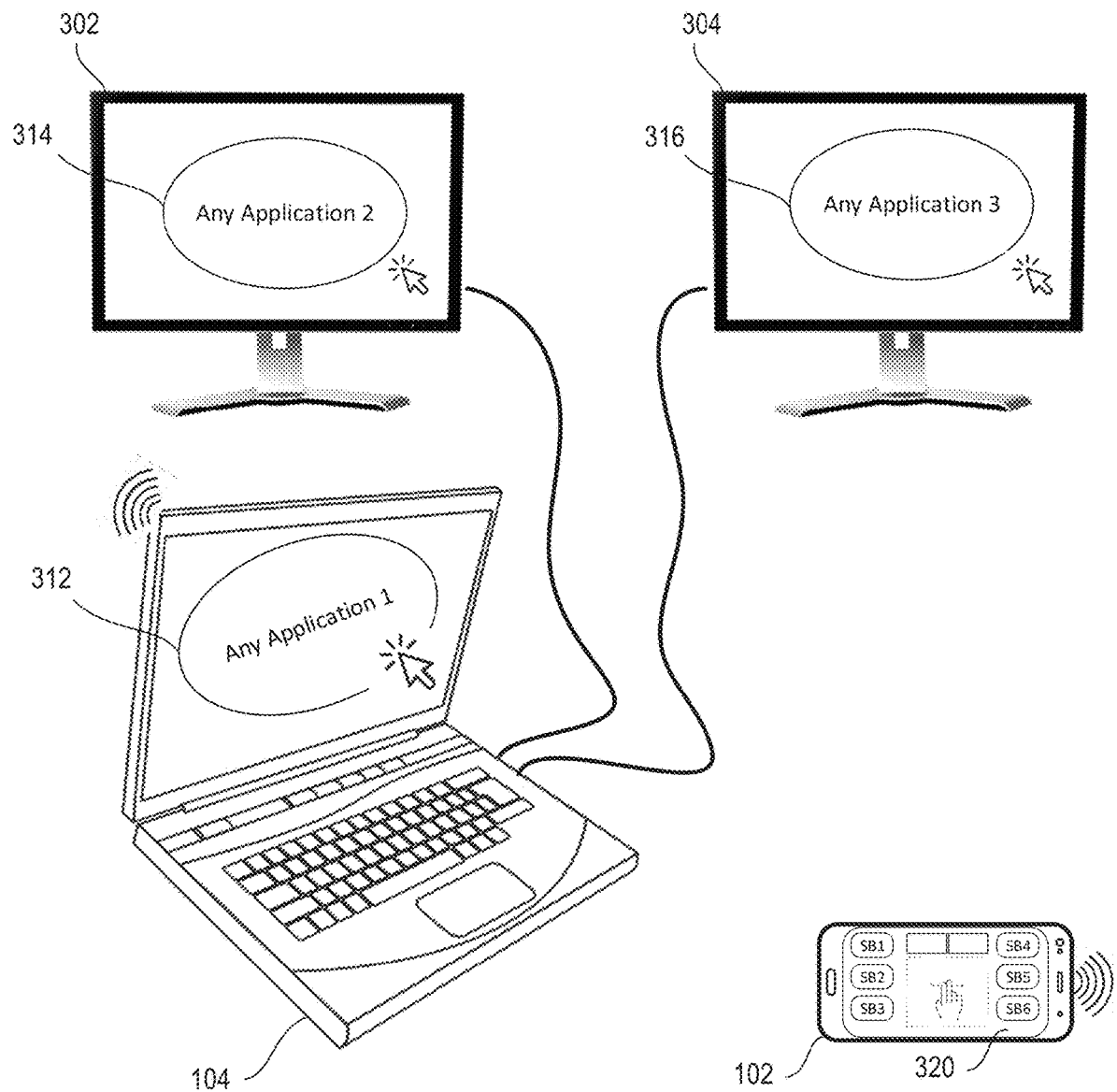
FIG. 3C shows an example of controlling a computing device using a mobile device when the computing device is connected to one or more monitors.

As a third example, one or more simulated buttons may correspond to a function for selecting among one or more monitors to which the computing device is connected. As shown in FIG. 3C, computing device 104 is connected to monitor 302 and monitor 304. In some embodiments, each monitor may display a GUI of one or more applications running on the computing device 104. For example, as shown, the screen of computing device 104 displays a GUI of application 312, monitor 302 displays a GUI of application 314, and monitor 304 displays a GUI of application 316. In some embodiments, the simulated buttons may be configured to cause a cursor to move between each of the applications 312, 314, 316. For example, receiving input through a simulated button may cause the cursor to automatically change position to a specified monitor corresponding to that simulated button.

In some embodiments, the simulated buttons may be configured to correspond to different functions depending on the application that is running on the computing device. For example, if the GUI is receiving input used to control application 312 on computing device 104, then the simulated buttons may correspond to a first set of functions. If the GUI is receiving input used to control application 314 on monitor 302, then the simulated buttons may correspond to a second set of functions. In some embodiments, the first set of functions may be completely different from the second set of functions, overlap the second set of functions, or include the same set of functions. For example, the first set of functions may be configured to generate text, while the second set of functions may be configured to navigate a menu within the corresponding application.

The interface configured to receive tactile input indicative of spatial information 308 may allow the user to input spatial data to the computing device. For the purpose of this example, interface 308 is configured to replicate a conventional trackpad of a computing device. Providing input through the interface 308 may cause the computing device to perform functions such as moving a cursor, scrolling through documents, dragging objects, or any other functions that are typically performed by operating a trackpad. For example, as shown in FIG. 3B, operating the interface 308 may cause cursor 312 to change position with respect to the screen of the computing device 104. As another example, as shown in FIG. 3C, operating the interface 308 may cause the cursor 312 to move between the screens of the computing device 104 and monitors 302, 304. A user may operate the interface 308 by providing gestures 310, which may include, for example, swiping in any suitable direction, tapping, or holding the interface 308.

Figure 4A:
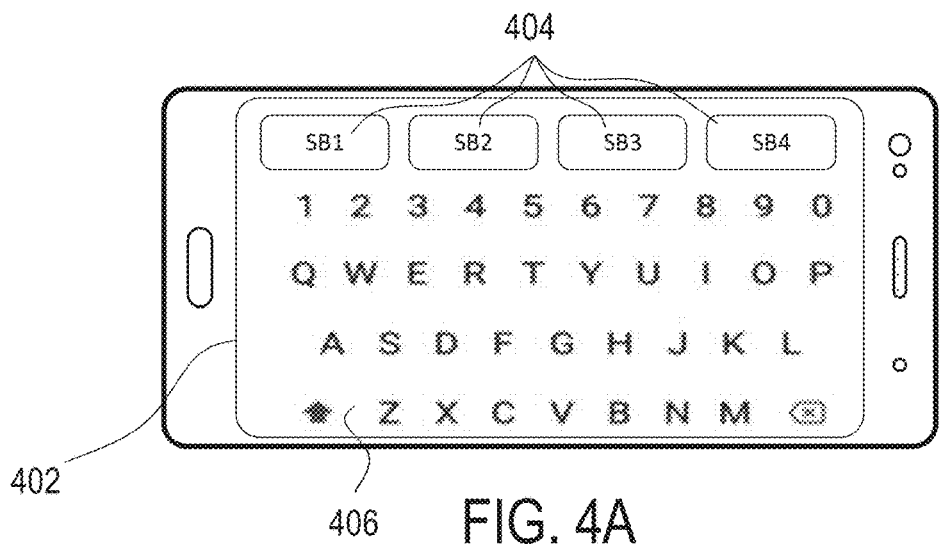
FIG. 4A-C show example GUIs configured to receive user input through one or more simulated buttons and/or interfaces configured to receive spatial input.
Figure 4B:
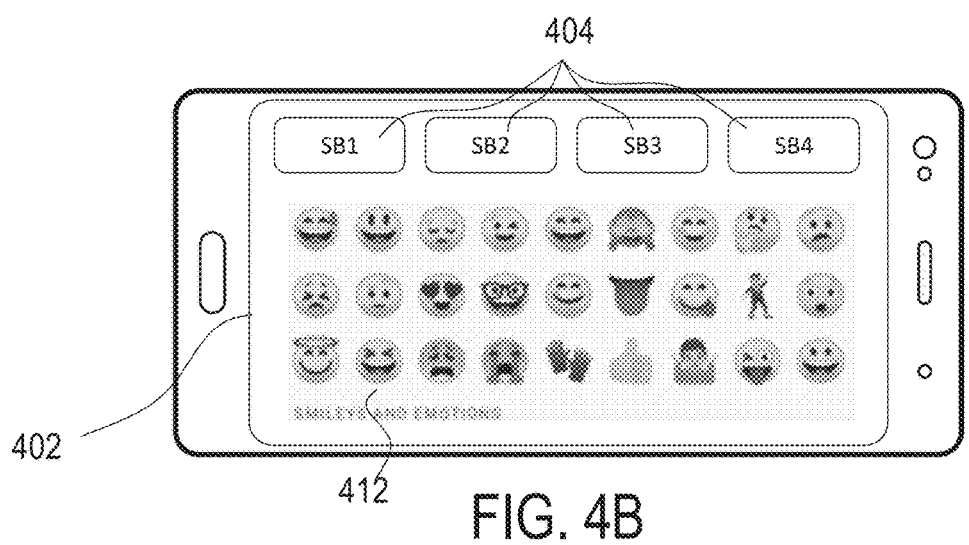
Figure 4C:
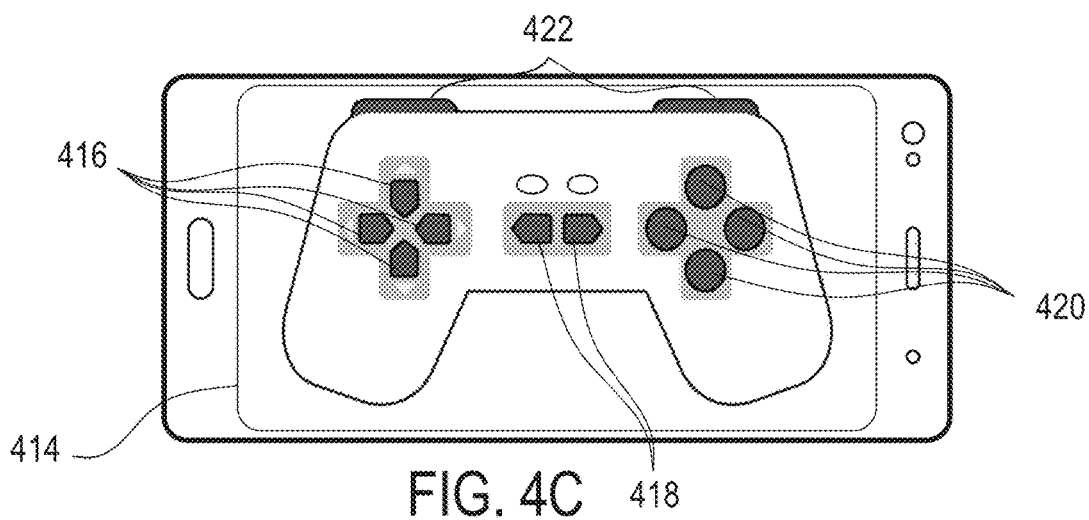

FIGS. 4A-C show additional example GUIs configured to receive user input though one or more simulated buttons and/or interfaces configured to receive tactile input indicative of spatial information.

FIG. 4A shows an example GUI 402 that includes one or more simulated buttons 404 and a simulated keyboard 406. In some embodiments, the one or more simulated buttons may be configured to perform one or more functions, such as any of the example functions described herein including with respect to FIGS. 3A-C. In some embodiments, the simulated keyboard 406 may include simulated buttons, each of which corresponds to a particular character. Receiving input through a simulated button may cause the computing device to generate the character corresponding to the selected simulated button. In some embodiments, the simulated keyboard may include any suitable keyboard layout in any suitable language, as the aspects of the technology described herein are not limited in this respect. For example, as shown, simulated keyboard 406 has a QWERTY layout. As another example, FIG. 4B shows an example simulated keyboard 412 that includes emojis. Receiving user input through a simulated button represented by an emoji may cause the computing device to generate the corresponding emoji.

As shown in FIG. 4C, an example GUI 414 may be designed to simulate a gaming control panel. In some embodiments, GUI 414 may include one or more simulated buttons for navigating a GUI of an application running on the computing device. For example, receiving user input through buttons 416 may cause a cursor on the GUI to move up, down, left, and/or right. In some embodiments, the GUI 414 may include simulated buttons (e.g., simulated buttons 418) for starting and pausing a game on the computing device. In some embodiments, other simulated buttons 420 and 422 may be configured to cause the computing device to perform one or more functions specific to the application and/or electronic game (e.g., causing a video game character to jump).

Figure 5:
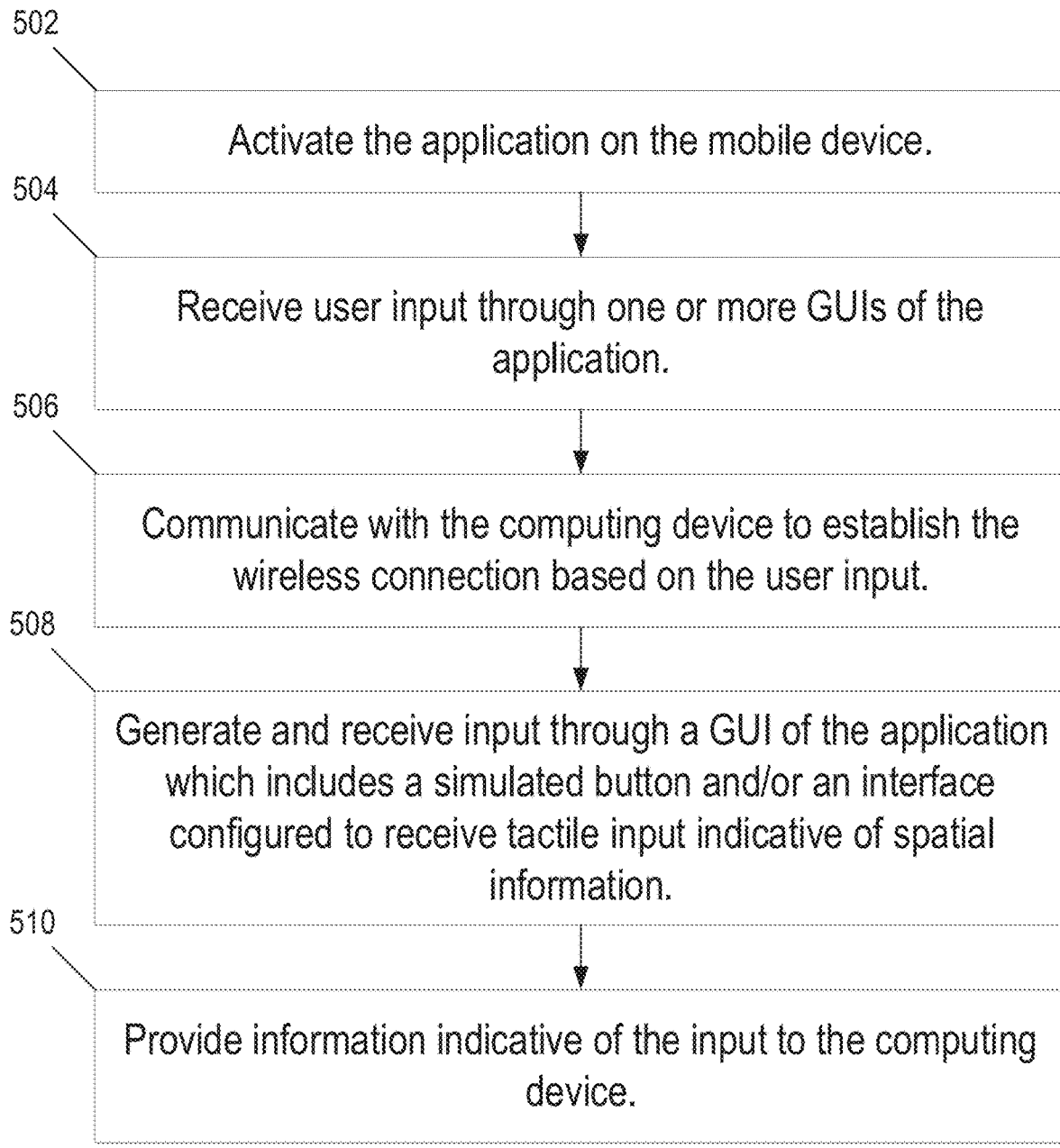
FIG. 5 shows a flowchart of a method for establishing a connection with and controlling the computing device.

FIG. 5 shows a flowchart of a method for establishing a connection and communicating information indicative of user input to a computing device different from the mobile device. The method of FIG. 5 may be performed by a processor of a mobile device, for example.

Figure 11:
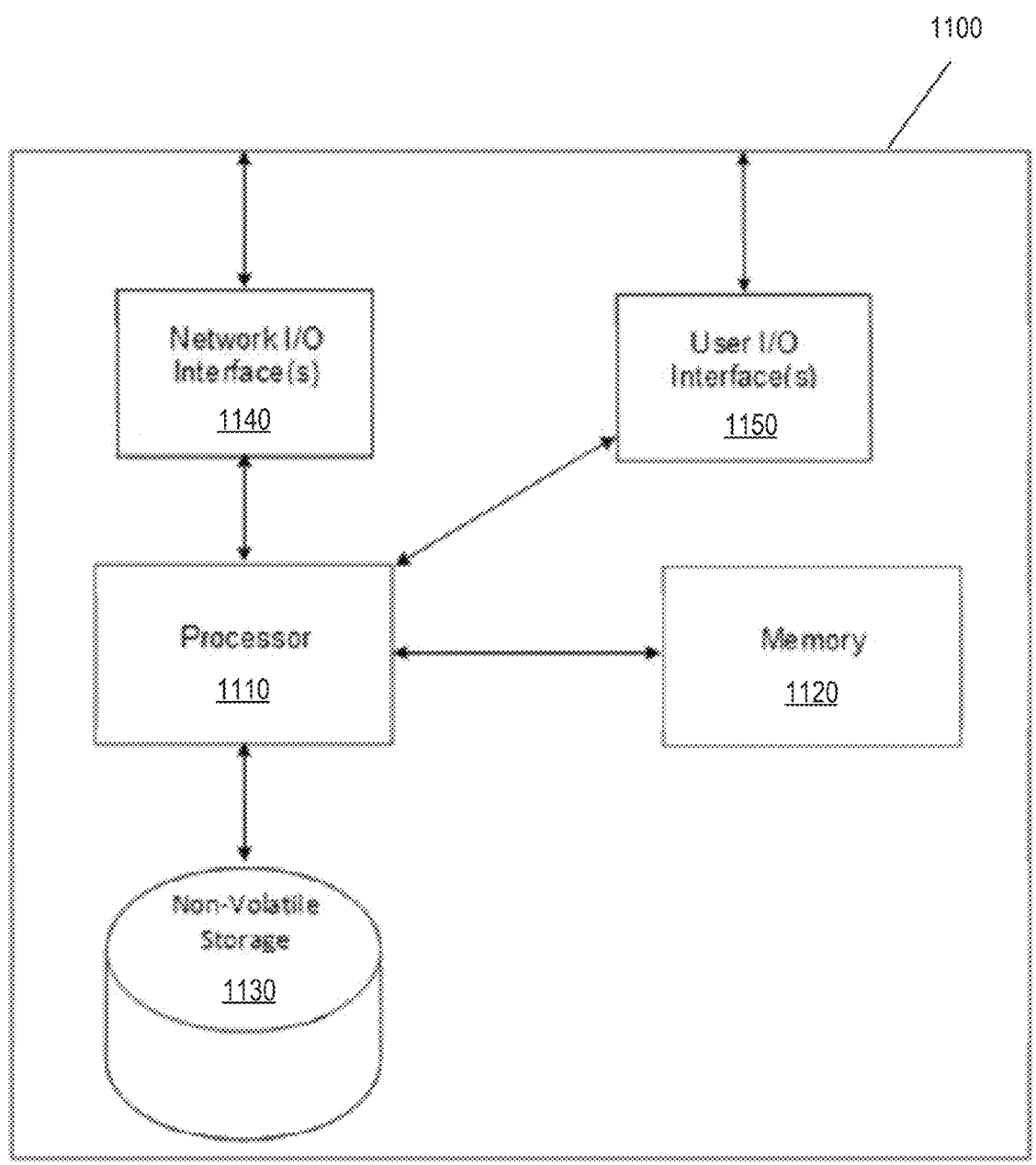
FIG. 11 shows a block diagram of an illustrative computer system that may be used in implementing some embodiments of the technology described herein.

At step 502, an application is activated on the mobile device. In some embodiments, the application may be activated in response to user input. For example, a user may select a GUI element that represents the application, which is stored in the memory (e.g., memory 1120 as shown in FIG. 11) of the mobile device. In some embodiments, the application is then activated per application logic of operation. Once the application is activated, one or more GUIs may be displayed on the mobile device (e.g., through a touch-sensitive screen of the mobile device). In some embodiments, the one or more GUIs may include menus and other elements that prompt a user to input configuration details.

At step 504, the mobile device receives user input through the one or more displayed GUIs. In some embodiments, the user input may be indicative of configuration details related to establishing a wireless data exchange. For example, the user may select from a menu of wireless communication protocols, provide authentication, and/or provide any suitable input for selecting and initiating a wireless data exchange. Additionally or alternatively, the user input may be indicative of details for configuring another GUI of the application (e.g., a GUI for controlling the computing device.) For example, a user may specify the function that corresponds to a simulated button, select an application on the computing device to be controlled by the mobile device, and/or provide any other suitable configuration input.

At step 506, the mobile device communicates with the computing device to establish a wireless data exchange based on the user input. In some embodiments, the user input (e.g., the communication details) will indicate a wireless protocol to be used to establish the wireless data exchange. Establishing the wireless data exchange may include using any suitable wireless communication protocol, such as WIFI, BLUETOOTH, ZIGBEE, or any other suitable protocol, as aspects of the technology are not limited in this respect. In some embodiments, establishing the wireless data exchange may include one or more steps of mutual authentication and/or function prioritization.

At step 508, the mobile device may activate and receive input through a GUI (e.g., different from the GUIs of step 502 and 504), which includes a simulated button and/or an interface configured to receive tactile input indicative of spatial information. In some embodiments, the GUI is configured and/or customized based on the configuration input received at step 504. Activating the GUI may include displaying the GUI on a display (e.g., a touch-sensitive screen) of the mobile device. A user may provide input through the GUI by interacting with the simulated button and/or interface.

At step 510, the mobile device provides information indicative of the input (e.g., the input received at step 508) to the computing device. This may be accomplished by wirelessly communicating the information indicative of input to the computing device using the wireless data exchange established at step 506. In some embodiments, the information indicative of input may include the raw user input data and/or user input data that has undergone one or more processing stages, as the aspects of the technology described herein are not limited in this respect. In some embodiments, providing the information indicative of the input to the computing device may cause the computing device to perform one or more functions (e.g., functions corresponding to the selected simulated buttons and/or interface).

It should be appreciated that the techniques for controlling a computing device using a mobile device (e.g., the techniques described herein including with respect to FIGS. 2 and 5) may be used regardless of whether the computing device includes a wireless power transmitter.

Figure 6:
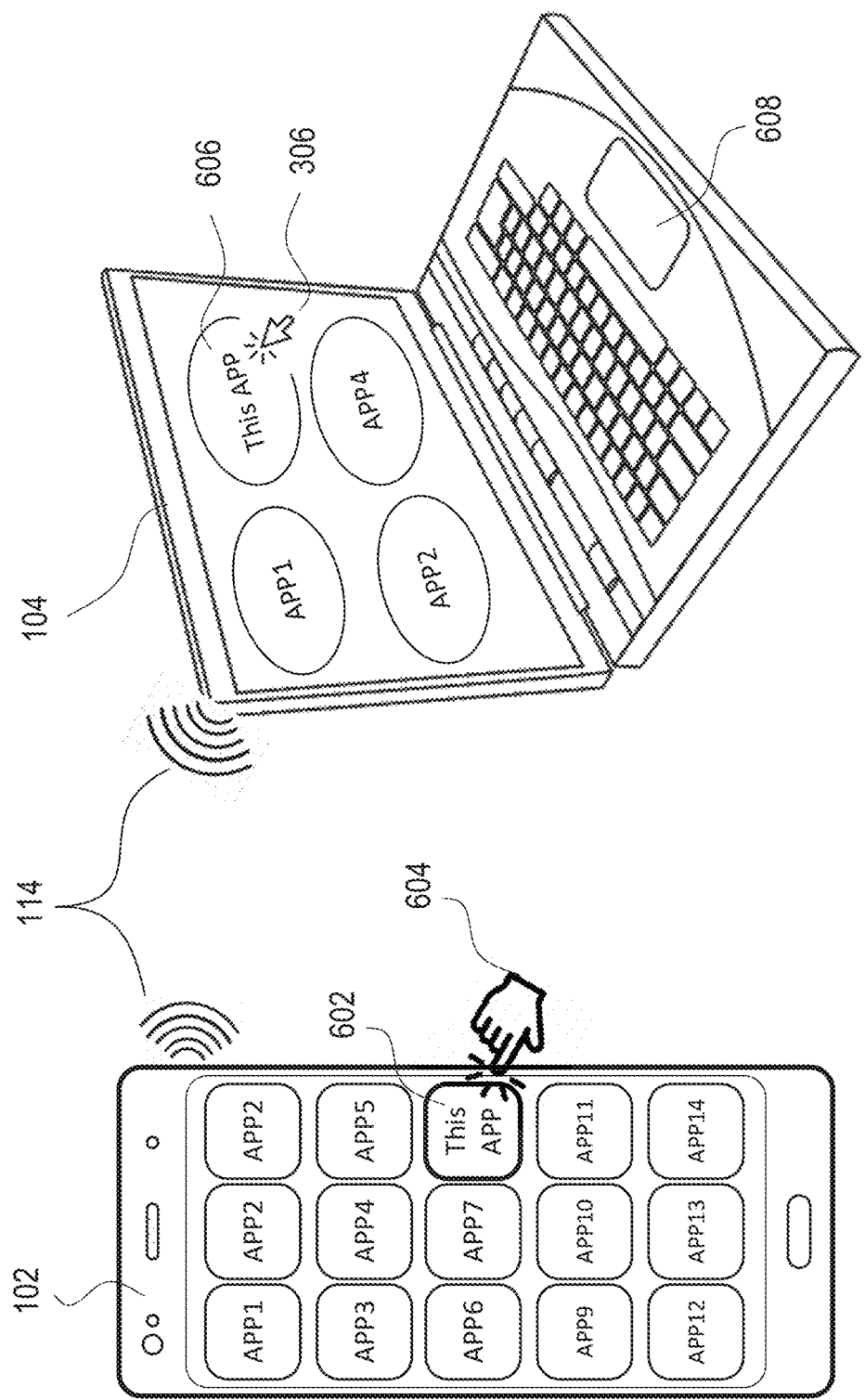
FIG. 6 shows an example of activating an application on a mobile device.

FIG. 6 shows an example of activating an application for controlling a computing device that does not include a wireless power transmitter. As shown, mobile device 102 displays a GUI with several selectable elements. Each element represents an application stored on the mobile device 102. A user 604 may select the GUI element 602 corresponding to an application for controlling computing device 104 (e.g., by interacting with a touch-sensitive interface of the mobile device 102).

Though not shown, the user 604 may be presented with one or more menus for configuring the wireless data exchange between the devices and/or the GUI for controlling the computing device. As a result, mobile device 102 may communicate with computing device 104 to establish wireless data exchange 114. The mobile device 102 may then cause the computing device 104 to perform one or more functions specified by the user 604. As shown in this example, the mobile device may cause the computing device 104 to activate application 606.

As described herein above, the inventors have developed techniques that allow a user to interact with a GUI of an application of a mobile device (e.g., GUI 110 of mobile device 102) to cause a computing device (e.g., computing device 104) to perform one or more functions. In some embodiments, the GUI and mobile device are configured to simulate conventional elements of a computing device, such as a touchpad and/or keyboard. As a result, the mobile device may be used in place of those conventional elements. For example, a user may interact with the mobile device to move a cursor on a computing device, rather than using the touchpad associated with the computing device. As another example, a user may interact with the mobile device to generate text on the computing device, rather than typing on the keyboard.

As a result, the user is no longer restricted to the confined space of a computing device. In some embodiments, the mobile device may be used to control the computing device within any suitable range afforded by the wireless data exchange between the devices. In some embodiments, the mobile device may be placed on the computing device. For example, the mobile device may be placed on the touchpad of the computing device, and a user may interact with the mobile device in place of the conventional touchpad.

Figure 7:
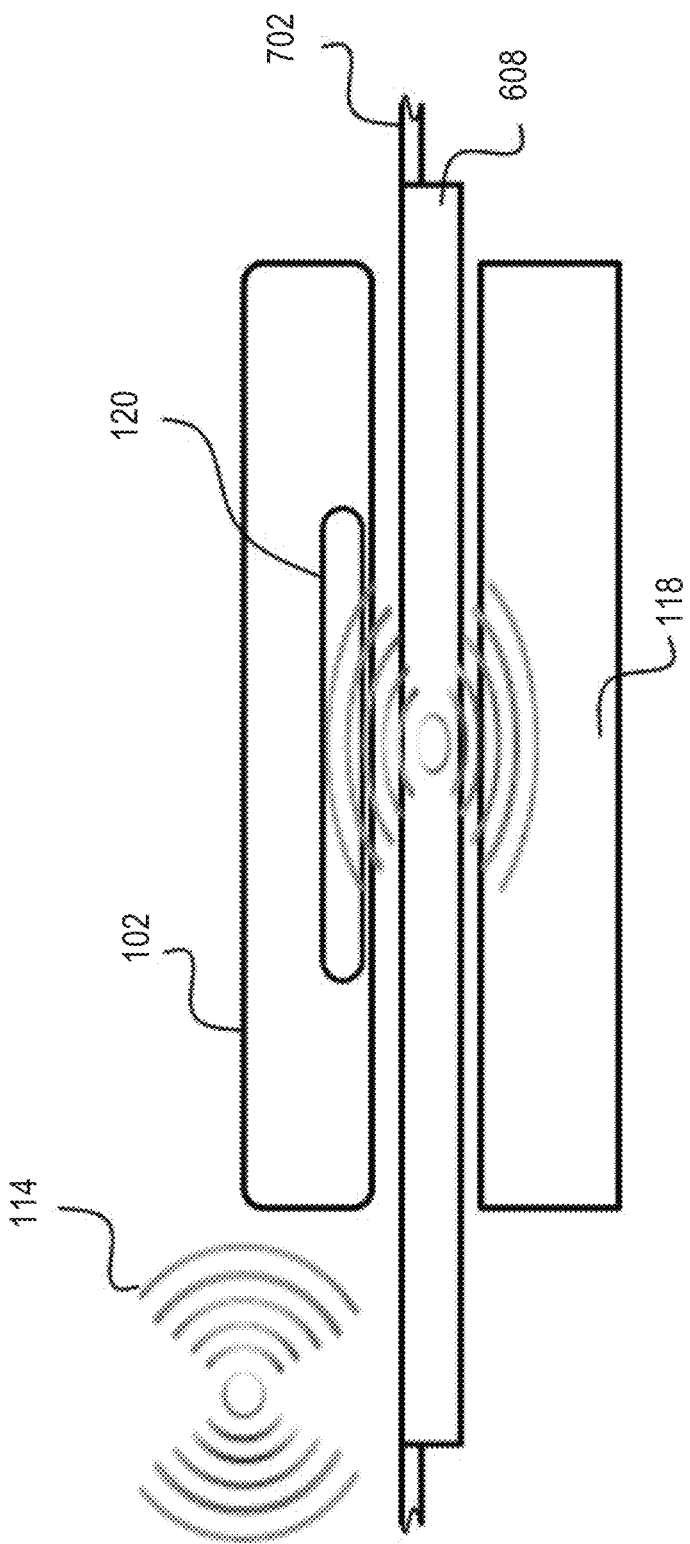
FIG. 7 shows an example of a wireless power system that includes a wireless power transmitter embedded beneath a trackpad of a computing device.

In some embodiments, a wireless power transmitter 118 may be embedded beneath a surface 702 of a computing device, as shown in FIG. 7. The mobile device 102 may be placed above the embedded wireless transmitter 118 without interrupting the operation of the computing device. For example, the wireless power transmitter 118 may be embedded beneath the touchpad 608 of the computing device. The mobile device 102 may be placed on the touchpad such that a wireless receiver 120 included in the mobile device 102 may be in communication with wireless power transmitter 118. The mobile device 102 may be operated by a user to cause the computing device to perform functions that would typically be performed as a result of operating the touchpad 608. As described herein above, the mobile device 102 may communicate information indicative of user input to the computing device via the wireless data exchange 114 and/or through the wireless power link established between the wireless power transmitter 118 and the wireless power receiver 120.

Figure 8:
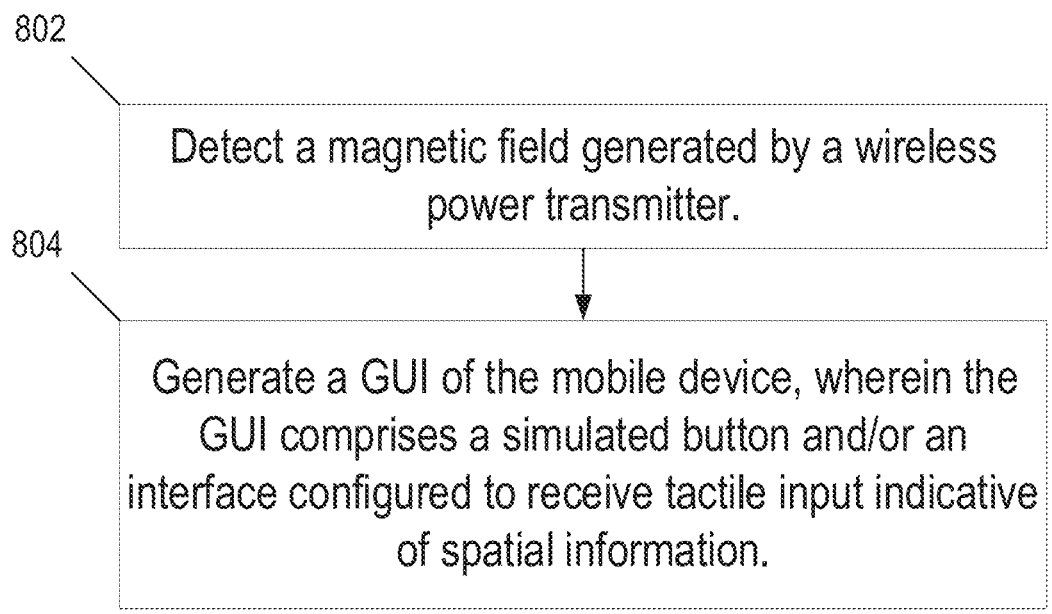
FIG. 8 shows a flowchart of a method for controlling a computing device using a mobile device that is different from the computing device, while the mobile device is being wirelessly powered.

FIG. 8 shows a flowchart of a method for controlling a computing device using a mobile device, while the mobile device is being wirelessly powered.

At step 802, the mobile device detects a magnetic field generated by a wireless power transmitter. In some embodiments, the mobile device may detect the magnetic field via a wireless power receiver included in the mobile device. In some embodiments, the wireless power transmitter may be embedded within a computing device (e.g., embedded beneath the trackpad of the computing device).

After detecting the magnetic field, at step 804, the mobile device may generate a GUI that includes a simulated button and/or an interface configured to receive tactile input indicative of spatial information. There may be several suitable options for generating the GUI at this step, examples of which are provided herein.

As a first example, upon detecting the magnetic field generated by the wireless power transmitter, the mobile device may automatically activate an application stored in the memory of the mobile device. If a user previously provided configuration information (e.g., as described herein including with respect to step 504 of FIG. 5), then the mobile device may automatically establish a wireless data exchange with the mobile device. Additionally or alternatively, one or more GUIs of the activated application may be presented to the user to provide such details, prior to establishing the wireless data exchange. The mobile device may then display the GUI that includes the simulated button and/or interface configured to receive tactile user input.

As a second example, upon detecting the magnetic field generated by the wireless power transmitter, the mobile device may display a GUI that prompts a user for additional information. For example, the GUI may prompt a user to confirm whether to activate the application. Upon receiving confirmation, the mobile device may proceed with activating the application, collecting configuration details, establishing the wireless data exchange, and displaying the GUI that includes the simulated button and/or interface configured to receive tactile user input.

As a third example, the application including the GUI may be manually activated either before or after detecting the magnetic field generated by the wireless power transmitter embedded in the computing device. For example, the application including the GUI may be manually activated according to techniques described herein including with respect to FIG. 5.

Experimental Data

Figure 9:
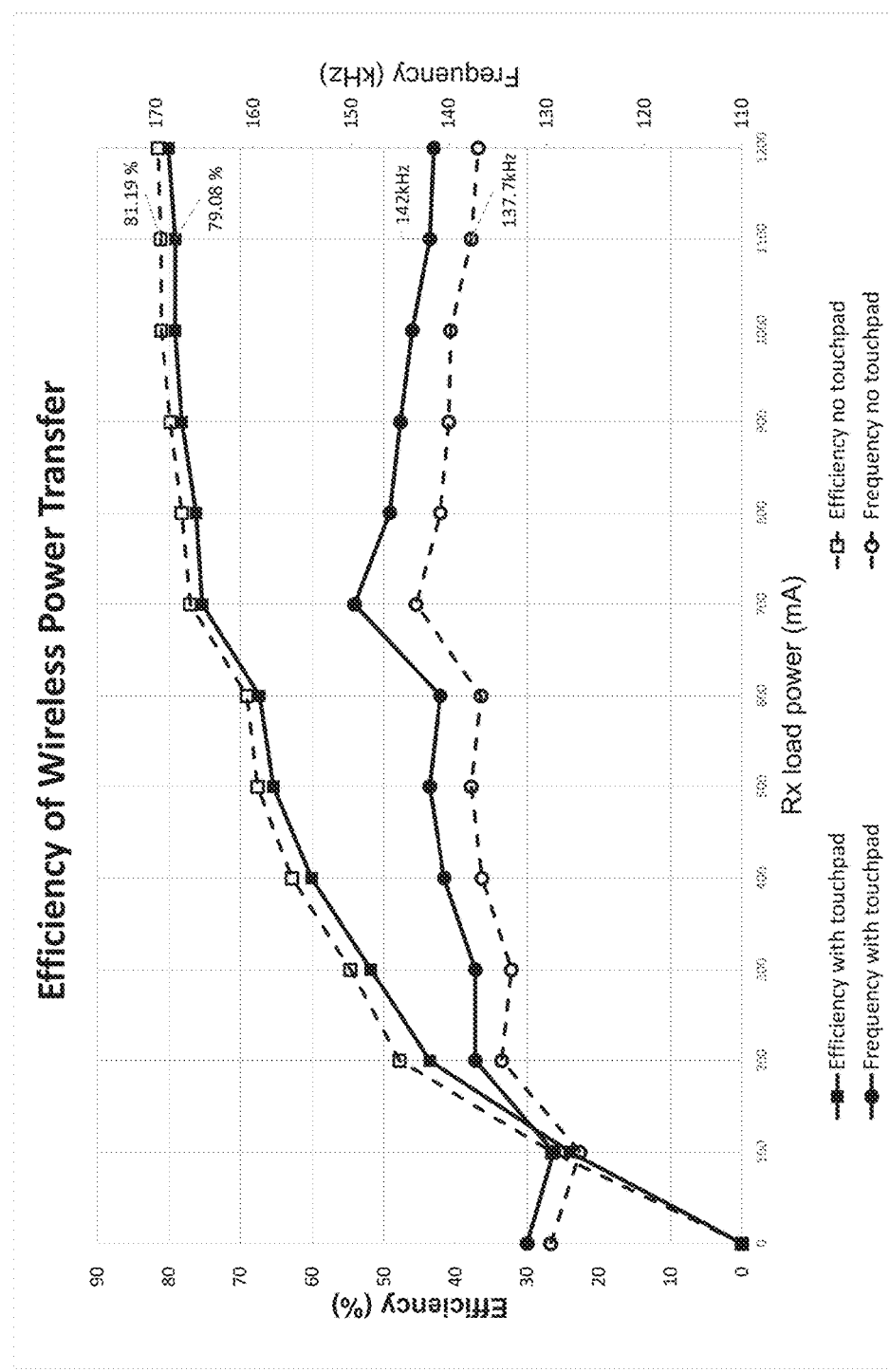
FIG. 9 illustrates feasibility of unrestricted wireless power transfer via a computing device touchpad. The data shows the efficiency and frequency of wireless power transmission.

FIG. 9 illustrates feasibility of unrestricted wireless power transfer via a computing touchpad. The data shows the efficiency and frequency of wireless power transmission. As shown, the horizontal axis represents RX load power (mA), the left-hand vertical axis represents the efficiency (%), and the right-hand vertical axis represents the frequency (kHz). As illustrated, there is only a slight reduction in efficiency when the wireless power transmitter is embedded beneath the touchpad. For example, at an RX load power of 1100 mA, there is about a 2% reduction in efficiency compared to the efficiency of the wireless power transmitter which is not embedded beneath the touchpad. Additionally, there is a slight increase in the frequency of the wireless power transfer system when the wireless power transmitter is embedded beneath the touchpad. For example, at the RX load power of 1100 mA, there is an increase of about 3 kHz compared to when the wireless transmitter is not embedded beneath the touchpad.

In conclusion, the experiments confirmed that it is effective to wirelessly power a mobile when the wireless power transmitter is embedded beneath the touchpad. The experiments resulted in the additional conclusion that it is not possible to operate the touchpad when the mobile device is placed on the touchpad while it is being wirelessly powered.

Additional Aspects

Figure 10:
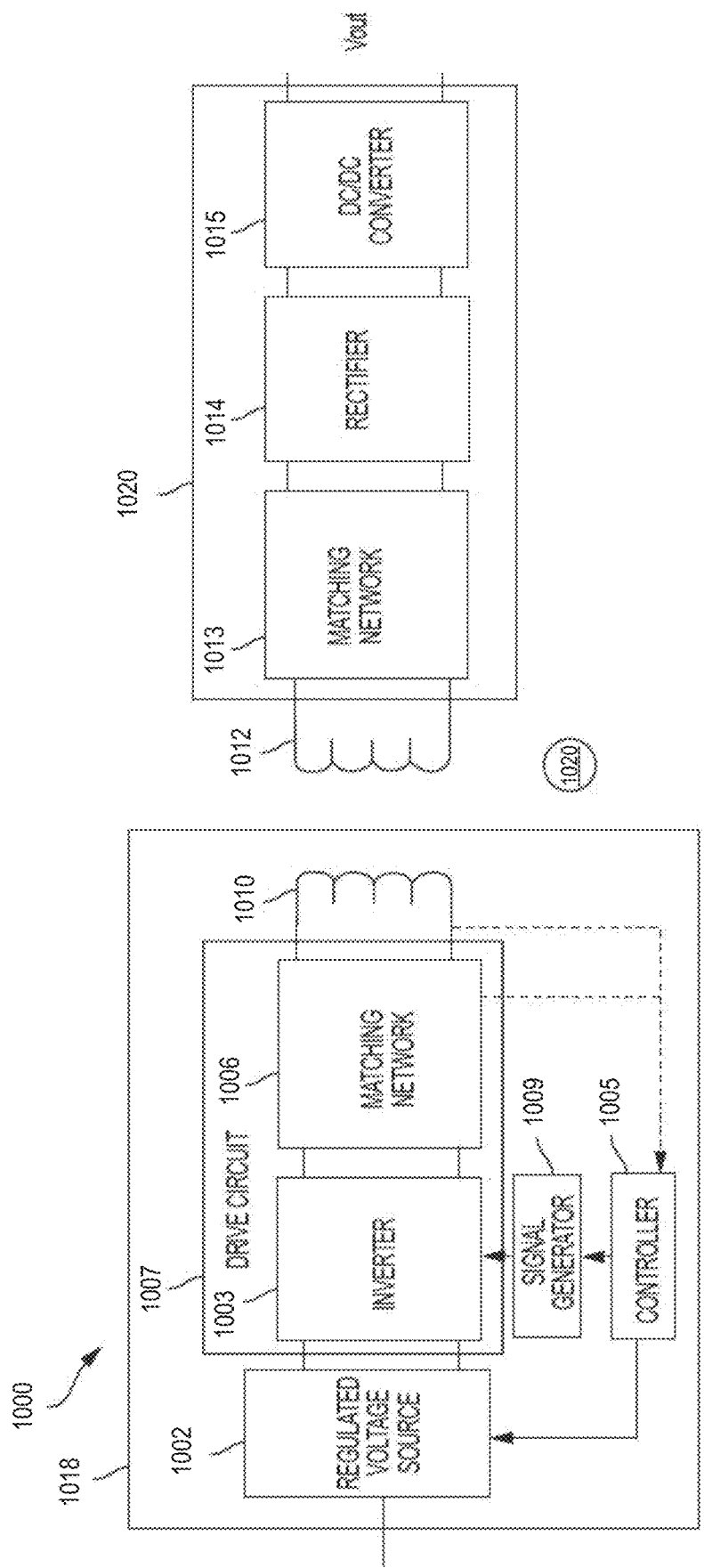
FIG. 10 shows a block diagram of a wireless power system including a wireless power transmitter and a wireless power receiver.

FIG. 10 shows a block diagram of an illustrative implementation of a wireless power system 1000 including a wireless power transmitter 1018 and a wireless power receiver 1020. The wireless power transmitter 1018 has a drive circuit 1007 including an inverter 1003 that drives a transmit coil 1010 through a matching network 1006. The wireless power transmitter 1018 may include a regulated voltage source 1002 (e.g., a voltage regulator) that provides a regulated DC voltage to the inverter 1003. The regulated voltage source 1002 produces a regulated DC output voltage in response to control stimulus from the controller 1005. In some embodiments, the drive circuit 1007 may be a class D or E amplifier that converts the DC voltage at the input of inverter 1003 into an AC output voltage to drive the transmit coil 1010. Producing an AC output voltage enables wireless power transmission through electromagnetic induction. The controller 1005 may control a signal generator 1009 to drive the inverter 1003 with signals of a selected wireless power transmission frequency. As an example, the inverter 1003 may be switched at a frequency between 100 and 205 kHz to transmit power to a wireless power receiver designed to receive wireless power according to the Qi specification for low power Qi receivers and 80-300 kHz for medium power Qi receivers. The inverter 1003 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 1005 may be an analog circuit or a digital circuit. Controller 1005 may be programmable and may command signal generator 1009 to produce signals at a desired transmission frequency based on stored program instructions, so that inverter 1003 switches at the desired transmission frequency. Matching network 1006 may facilitate wireless power delivery by presenting a suitable impedance to the inverter 1003. The matching network(s) may have one or more capacitive or inductive elements or any suitable combination of capacitive and inductive elements. Since the transmit coil 1010 may have an inductive impedance, in some embodiments the matching network 1006 may include one or more capacitive elements, which, when combined with the impedance(s) of the transmit coil 1010, presents an impedance to the output of inverter 1003 suitable for driving the transmit coil 1010. In some embodiments, during wireless power transfer the resonant frequency of the matching network 1006 may be set equal to or approximately equal to the switching frequency of the inverter 1003. The transmit coil 1010 may be realized by any suitable type of conductors. The conductors may be wires, including solid wire or Litz wire, or patterned conductors, such as patterned conductors of a PC board or an integrated circuit.

The AC current in the transmit coil 1010 generates an oscillating magnetic field in accordance with Ampere's law. The oscillating magnetic field induces an AC voltage into a receiver coil 1012 of the wireless power receiver 1020 in accordance with Faraday's law. The AC voltage induced in the receiver coil 1012 is provided through a matching network 1013 to a rectifier 1014 that generates an unregulated DC voltage. Rectifier 1014 may be a synchronous rectifier or may be implemented using diodes. The unregulated DC voltage is regulated using a DC/DC converter 1015, the output of which may be filtered and provided to a load as output voltage Vout. In some alternate embodiments the DC/DC converter 1015 can be replaced by a linear regulator or battery charger, or eliminated altogether. In some embodiments, the wireless power transmitter 1018 may have communication circuitry (e.g., within controller 1005) for communicating with wireless power receiver 1020 either through in-band communication or out of band communication. Similarly, wireless power receiver 1020 may have communication circuitry for communicating with a wireless power transmitter 1018. The wireless power receiver 1020 may send feedback information to the wireless power transmitter 1018 indicating the power demanded at the wireless power receiver 1020, or a change in the power level to be provided. In response, the wireless power transmitter 1018 may increase or decrease its power output accordingly. The wireless power transmitter 1018 may control the amount of power transmitted by varying the voltage drive level, the frequency of the signal transmitted or both. Any suitable power control techniques may be used.

An illustrative implementation of a computer system 1100 that may be used in connection with any of the embodiments of the technology described herein is shown in FIG. 11. The one computer system 1100 includes one or more computer hardware processors 1110 and one or more articles of manufacture that comprise non-transitory computer-readable storage media (e.g., memory 1120 and one or more non-volatile storage media 1130). The processor 1110 may control writing data to and reading data from the memory 1120 and the non-volatile storage device 1130 in any suitable manner, as the aspects of the technology described herein are not limited in this respect. To perform any of the functionality described herein, the processor(s) 1110 may execute one or more processor-executable instructions stored in one or more non-transitory computer-readable storage media (e.g., the memory 1120), which may serve as non-transitory computer-readable storage media storing processor-executable instructions for execution by the processor 1110.

Computing device 1100 may also include a network input/output (I/O) interface 1140 via which the computing device may communicate with other computing devices (e.g., over a network), and may also include one or more user I/O interfaces 1150, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments may be implemented in any of numerous ways. For example, the embodiments may be implemented using hardware, software or a combination thereof. When implemented in software, the software code can be executed on any suitable computer hardware processor (e.g., one or more microprocessors, one or more graphic processing units (GPUs)) or collection of computer hardware processors, whether provided in a single computing device or distributed among multiple computing devices. Additionally or alternatively, the embodiments may be implemented using one or more application specific integrated circuits (ASICs), and/or one or more field programmable gate arrays (FPGAs). As such, embodiments may be implemented using any suitable computing device (e.g., one or more computer hardware processors, one or more ASICs, and/or one or more FPGAs).

It should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A mobile device, comprising:
a processor configured to:
 detect a magnetic field generated by a wireless power transmitter;
 after detecting the magnetic field, generate a first graphical user interface (GUI) of the mobile device, wherein the first GUI comprises a simulated button and/or an interface configured to receive tactile input indicative of spatial information;
 receive user input through the first GUI; and
 provide information indicative of the user input to a computing device, wherein providing the information to the computing device causes the computing device to change a position of a cursor in a second GUI of the computing device, wherein the cursor is not included in the first GUI.

2. The mobile device of claim 1, wherein the wireless power transmitter is within the computing device different from the mobile device.

3. The mobile device of claim 2, wherein the wireless power transmitter is beneath a trackpad of the computing device.

4. The mobile device of claim 3, wherein the mobile device is positioned above the trackpad of the computing device such that the mobile device is configured to be charged by the wireless power transmitter.

5. The mobile device of claim 1, wherein providing the information indicative of the user input to the computing device comprises communicating the information indicative of the user input through a wireless data exchange.

6. The mobile device of claim 1, wherein providing the information indicative of the user input to the computing device comprises communicating the information indicative of the user input between a wireless power receiver of the mobile device and the wireless power transmitter.

7. The mobile device of claim 1, wherein providing the information indicative of the user input to the computing device comprises in-band and/or out-of-band communication.

8. The mobile device of claim 1, wherein the first GUI comprises a simulated trackpad.

9. The mobile device of claim 1, wherein the processor is further configured to:
receive second user input through the first GUI; and
provide information indicative of the second user input to the computing device, wherein providing the information indicative of the second user input to the computing device causes the computing device to perform a function specified by a user.

10. The mobile device of claim 1, wherein the processor is further configured to:
receive second user input through the first GUI; and
provide information indicative of the second user input to the computing device, wherein providing the information indicative of the second user input to the computing device causes the computing device to generate text.

11. The mobile device of claim 1, wherein generating the first GUI comprises generating the first GUI in response to detecting the magnetic field.

12. The mobile device of claim 1, wherein the processor is further configured to, in response to detecting the magnetic field, prompt a user for additional information prior to generating the first GUI.

13. The mobile device of claim 12, wherein prompting the user for the additional information comprises prompting the user to confirm whether to generate the first GUI; and
wherein generating the first GUI comprises generating the first GUI in response to receiving user input.

14. The mobile device of claim 12, wherein the processor is further configured to, after generating the first GUI, establish a wireless data exchange with the computing device different from the mobile device to reflect, in the second GUI of the computing device, tactile inputs received by the first GUI.

15. The mobile device of claim 1 wherein the spatial information comprises information indicative of a position of the cursor in the second GUI of the computing device.

16. The mobile device of claim 1 wherein providing the information indicative of the user input to the computing device comprises wirelessly communicating the information indicative of the user input to the computing device.

17. A method, comprising:
detecting a magnetic field generated by a wireless power transmitter;
after detecting the magnetic field, generating a first graphical user interface (GUI) of a mobile device, wherein the first GUI comprises a simulated button and/or an interface configured to receive tactile input indicative of spatial information;
receiving user input through the first GUI; and
providing information indicative of the user input to a computing device, wherein providing the information to the computing device causes the computing device to change a position of a cursor in a second GUI of the computing device, wherein the cursor is not included in the first GUI.

18. At least one non-transitory computer-readable storage medium storing processor executable instructions that, when executed by at least one processor, cause the at least one processor to perform:
detecting a magnetic field generated by a wireless power transmitter;
after detecting the magnetic field, generating a first graphical user interface (GUI) of a mobile device, wherein the first GUI comprises a simulated button and/or an interface configured to receive tactile input indicative of spatial information;
receiving user input through the first GUI; and
providing information indicative of the user input to a computing device, wherein providing the information to the computing device causes the computing device to change a position of a cursor in a second GUI of the computing device, wherein the cursor is not included in the first GUI.

19. A system, comprising:
a processor configured to:
detect a magnetic field generated by a wireless power transmitter;
after detecting the magnetic field, generate a first graphical user interface (GUI) of a mobile device, wherein the first GUI comprises a simulated button and/or an interface configured to receive tactile input indicative of spatial information;
receive user input through the first GUI; and
provide information indicative of the user input to a computing device, wherein providing the information to the computing device causes the computing device to change a position of a cursor in a second GUI of the computing device, wherein the cursor is not included in the first GUI; and
the computing device comprising a second processor configured to display the second GUI based on the tactile input.

20. The mobile device of claim 1, wherein the interface configured to receive tactile input indicative spatial information comprises one or more of a simulated trackpad, a simulated analog stick, and a simulated trackball.

21. The mobile device of claim 1, wherein receiving the user input through the first GUI comprises receiving the user input through the interface configured to receive tactile input indicative of spatial information.

* * * * *